E. R. ZÜRCHER-HINNEN.
ARTIFICIAL TOOTH.
APPLICATION FILED JULY 25, 1916.
1,260,118.
Patented Mar. 19, 1918.
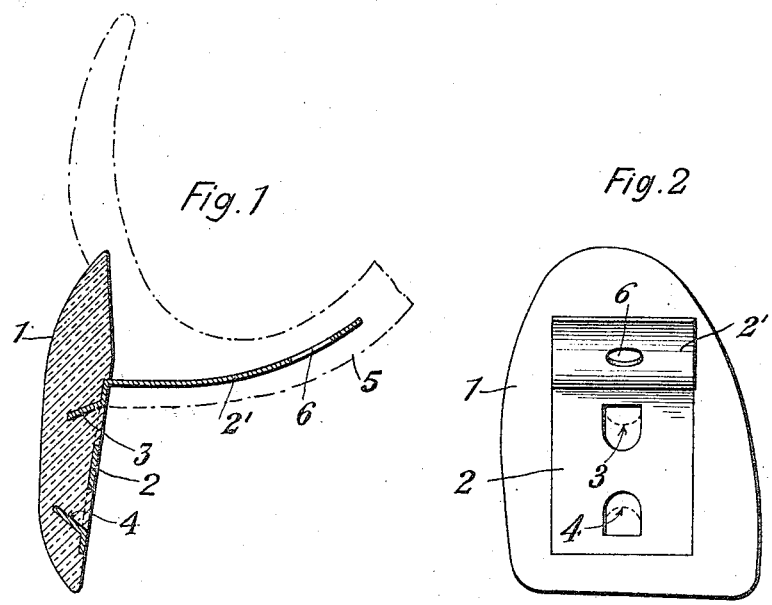
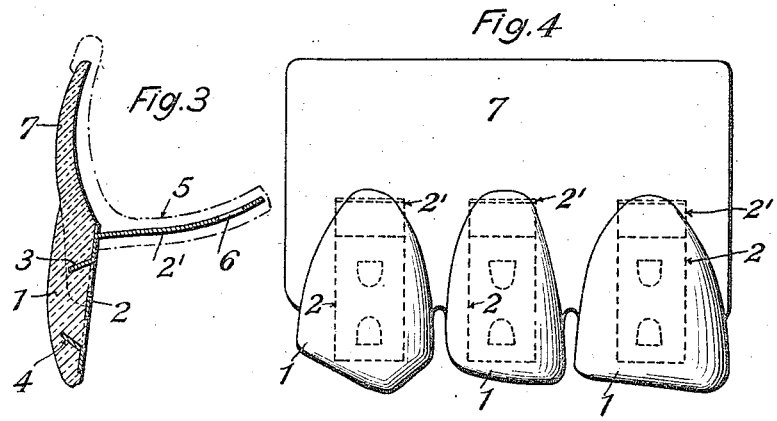
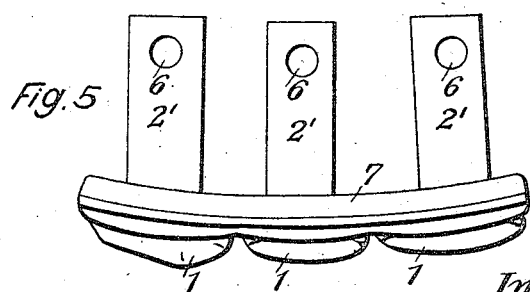
Inventor:
Emil Rudolf Zürcher-Hinnen
By
Atty.

UNITED STATES PATENT OFFICE.

EMIL RUDOLF ZÜRCHER-HINNEN, OF ZURICH, SWITZERLAND.

ARTIFICIAL TOOTH.

1,260,118.  Specification of Letters Patent.  Patented Mar. 19, 1918.

Application filed July 25, 1916.  Serial No. 111,145.

*To all whom it may concern:*

Be it known that I, EMIL RUDOLF ZÜRCHER-HINNEN, a citizen of the Republic of Switzerland, residing at Zurich, Switzerland, have invented certain new and useful Improvements in Artificial Teeth; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to artificial teeth of that class which, in contradistinction to teeth with interchangeable facings, may be completely finished at the factory.

It is the object of this invention to provide an artificial tooth of the kind referred to, in which with a very small quantity of foreign substance inserted into the porcelain mass the greatest possible strength as well as with regard to the tooth as to the connection between the porcelain portion and the backing is obtained.

This novel tooth is provided with a burnt-in, plate-like backing for securing it to the rubber or metal plate, the stamped out flaps of which backing are tongue-shaped. These stamped out, tongue-shaped projections are inclined in opposite directions, so that they provide a claw-like connection between the porcelain facing and backing. This novel method of securing the backing provided with tongue-shaped projections has moreover, particular advantages when block teeth are used. The block teeth with artificial gums made hitherto could not be used in those cases where the insufficiently resorbed jaw prolongation would have caused a protrusion of the lip owing to the body of the teeth being too thick. If to this were added a deep over-bite, the use of such block-teeth would be out of the question for technical reasons. In the case of the present tooth it is possible to make the porcelain body of the block tooth much thinner without decreasing its strength, and the new method of anchorage permits the provision of a backing extension for securing the tooth to the rubber or metal plate at any desired level. The said extension can be worked in metal plates during soldering or it can be cut away, in which case the connection of the tooth can be effected directly with the plate at any desired level.

This invention will now be more particularly described with reference to the accompanying drawing, which illustrates two constructional examples of the invention.

In this drawing:

Figure 1 is a cross-section through a single tooth;

Fig. 2 is a corresponding side-view, seen from the right hand side;

Fig. 3 is a cross-section through a block comprising several teeth;

Fig. 4 is a corresponding side-view, seen from the left hand side, and

Fig. 5 is a plan view thereof.

In the embodiment of the invention shown in Figs. 1 and 2, 1 is the porcelain-mass forming the tooth. 2, 2' denote a backing, the part 2 of which lies in a recess provided on the rear of the porcelain-mass 1. 3 and 4 denote flaps stamped-out of the backing part 2 and effecting a solid connection between the porcelain-mass 1 and the backing 2, 2'. The flaps 3, 4 are inclined in opposite directions, that is, they are lying in a plane at right angles to the plane, in which occurs the main stress of the tooth-mass. This stress occurs in an oblique direction relatively to the longitudinal direction of the tooth. It will be seen that in the embodiment shown only one of the flaps 3, 4 lies in said oblique direction. Owing to the arrangement of the flaps 3, 4 in said plane, the backing 2, 2' may be anchored in the most massy part of the tooth-mass, so that the greatest possible solidity is imparted to this mass and cross-breaks are so to speak eliminated. The shank 2' projects away from the tooth-mass and comes to lie into the member 5 (shown in the drawing in point and dash lines, while not forming a part of the invention) connecting the single artificial teeth and serving to secure the latter within the mouth. In order to facilitate the connection of the parts 2' and 5 I provide in the shank 2' an aperture 6. The connecting member 5 may be of well known construction.

In carrying the invention into effect as shown in Figs. 3 to 5 I combine three teeth 1 to one block. In this embodiment the part 7 of the block represents the gum. To the rear of each part 1 of the block corresponding to a tooth is secured, in the same manner as in the first embodiment, a backing 2, 2'. 5 denotes again the member serving to secure the teeth within the mouth.

Besides the advantage referred to, which is due to the peculiar arrangement of the securing flaps 3, 4, the tooth according to this invention presents the further advantage, that any plating-work, which has always to be carried out when using known artificial teeth for plates with a deep over-bite, may be omitted, as the bending of the backing out of the plane of the porcelain-mass of the artificial tooth may be effected at a place, which lies much nearer to the upper edge of the porcelain-mass than the pins of the commonly used artificial teeth. For carrying the invention into effect it is only necessary to provide special models of teeth, the wholesale manufacture of which is easily possible.

Also in block-teeth, with or without gum, the thickness of the porcelain may be reduced to a minimum.

The artificial tooth according to this invention is particularly adapted to be used as a front tooth, and it may also be used for any kind of work, thus also for crowns and bridge-work.

What I claim is:

An artificial tooth comprising a porcelain front portion or facing and a permanently attached backing flush with the rear surface of the porcelain and fire-connected thereto, said backing comprising a single element consisting of a plate having two flat tongues punched therefrom one above the other in the same vertical plane and inclined toward each other, one of said tongues being above and the other below the point of usual rupture of the porcelain, said backing having a shank at its upper edge at an angle thereto for attachment in the usual plate.

In testimony that I claim the foregoing as my invention, I have signed my name in presence of two subscribing witnesses.

EMIL RUDOLF ZÜRCHER-HINNEN.

Witnesses:
ERNST FISCHER,
CARL GUBLER.

Copies of this patent may be obtained for five cents each, by addressing the "Commissioner of Patents, Washington, D. C."